United States Patent [19]

Fukuoka et al.

[11] Patent Number: 5,251,072
[45] Date of Patent: Oct. 5, 1993

[54] IMAGE READER

[75] Inventors: Hiroaki Fukuoka; Junji Kawano; Yoshikazu Miyashita; Hideaki Sekiguchi; Hitoshi Nakagawa, all of Ise, Japan

[73] Assignee: Shinko Electric Co., Ltd., Tokyo, Japan

[21] Appl. No.: 890,760

[22] Filed: May 27, 1992

[30] Foreign Application Priority Data

May 28, 1991 [JP] Japan .................................. 3-123358
Oct. 18, 1991 [JP] Japan .................................. 3-270869
Nov. 8, 1991 [JP] Japan .................................. 3-292924

[51] Int. Cl.$^5$ ............................................. G02B 27/00
[52] U.S. Cl. ..................................... 359/896; 355/27; 355/50; 355/71; 362/260
[58] Field of Search .................... 359/896; 355/50, 54, 355/66, 67, 68, 72, 75, 27, 71, 113, 122, 125, 126, 127; 250/216, 271, 556; 362/228, 229, 260

[56] References Cited

U.S. PATENT DOCUMENTS

| | | | |
|---|---|---|---|
| 4,716,442 | 12/1987 | Yazaki | 355/71 |
| 4,963,934 | 10/1990 | Nezu | 355/75 |
| 4,987,442 | 1/1991 | Uemori | 355/50 |
| 5,107,297 | 4/1992 | Moormann | 355/50 |
| 5,146,393 | 9/1992 | Crane | 362/260 |
| 5,164,763 | 11/1992 | Masanori et al. | 355/27 |

Primary Examiner—Loha Ben
Attorney, Agent, or Firm—Flynn, Thiel, Boutell & Tanis

[57] ABSTRACT

An image reader is capable of improving the quality of reading a transmission manuscript and of reducing a cost for a luminaire power source compared with the conventional image reader. The image reader comprises a casing having a ceiling of a transparent manuscript plate, the casing further housing therein a read unit provided with a reflection read light source unit, a drive mechanism for reciprocally moving the read unit from its home position and a luminaire power source unit; and a transmission read light source unit provided separately from the casing, wherein the transmitted light which has passed the manuscript or the reflected light which has reflected from the manuscript is focused on the receiving surface of a read sensor of the read unit to thereby produce the image thereon, wherein the transmission read light source unit can be connected to the read unit mechanically and electrically by a connecting mechanism having a releasing function, and cooperate with the read unit, and wherein the casing has recess portions thereon in the scanning direction of the connecting mechanism, and wherein the luminaire power source unit is provided with an inverter power source which is common to the reflection read light source unit and the transmission read light source unit and a light source unit switching device which can switch the output of the inverter power source to the reflection read light source unit or the transmission read light source unit.

14 Claims, 18 Drawing Sheets

IMAGE READER

BACKGROUND OF THE INVENTION

1. Field of the Invention

The present invention relates to an image reader.

2. Prior Art

FIG. 22 a schematic view explaining a basic operation of a conventional image reader for reading both a reflection manuscript and a transmission manuscript. The image reader comprises a casing 70, a read unit 71, a manuscript plate 72 respectively housed in the casing 70 and a light source for the transmission manuscript disposed outside the casing 70.

Since a high quality image can be obtained when the light source is disposed over the manuscript when the transmission manuscript is read, the light source of the transmission manuscript is disposed outside the casing. An manuscript plate of this image reader is a movable type.

The conventional image reader has such a drawback that a large space is required for installation thereof since the manuscript plate should be moved for reading both the reflection manuscript and the transmission manuscript. If the manuscript plate is of a fixed-type, this drawback can be solved. However, in the latter case, both the light source and the read portion should be moved together, which involves a complicated structure. Furthermore, when the reflection manuscript is read, a light source unit for reading the transmission manuscript (hereinafter referred to as a transmission read light source unit) impedes to read the reflection manuscript, hence the transmission read light source unit is separably kept, which is troublesome. Still furthermore, It is necessary to provide a power source for supplying the power to the transmission read light source unit in addition to a power source for supplying the power to the light source unit for reading the reflection manuscript (hereinafter referred to as a reflection read light source unit), which makes the image reader expensive.

SUMMARY OF THE INVENTION

The present invention has been made to solve the problems in the conventional image reader and to provide a fixed manuscript plate type image reader for use in reading the reflection/transmission manuscripts which is capable of reading the reflection manuscript while set the transmission read light source, without enlarging the size thereof and with reduction of the cost involved in the luminaire power source compared with the conventional image reader.

To achieve the above object, the image reader according to a preferred embodiment of the present invention comprises a casing having a ceiling of a transparent plate, the casing further housing therein a read unit provided with a reflection read light source unit, a drive mechanism for reciprocally moving the read unit from its home position and a luminaire power source unit; and a transmission read light source unit provided separately from the casing; wherein the transmitted light which has passed the manuscript or the reflected light which reflected from the manuscript are focused on a receiving surface of a read sensor of the read unit to thereby produce the image thereon;

characterized in that the image reader further comprises a holding mechanism for supporting the transmission read light source unit and a connecting mechanism capable of connecting the transmission read light source unit to the read unit mechanically and electrically, the connecting mechanism being slidable in holder recesses provided in the ceiling, the luminaire power source unit provided with an inverter power source which is common to the reflection read light source unit and the transmission read light source unit and a light source unit switching device which can switch the output of the inverter power source to the reflection read light source unit or the transmission read light source unit.

The above and other objects, features and advantages of the present invention will become more apparent from the following description taken in conjunction with the accompanying drawings.

PREFERRED EMBODIMENT

An image reader according to a preferred embodiment of the present invention will be described hereinafter with reference to attached drawings.

Figure 1:
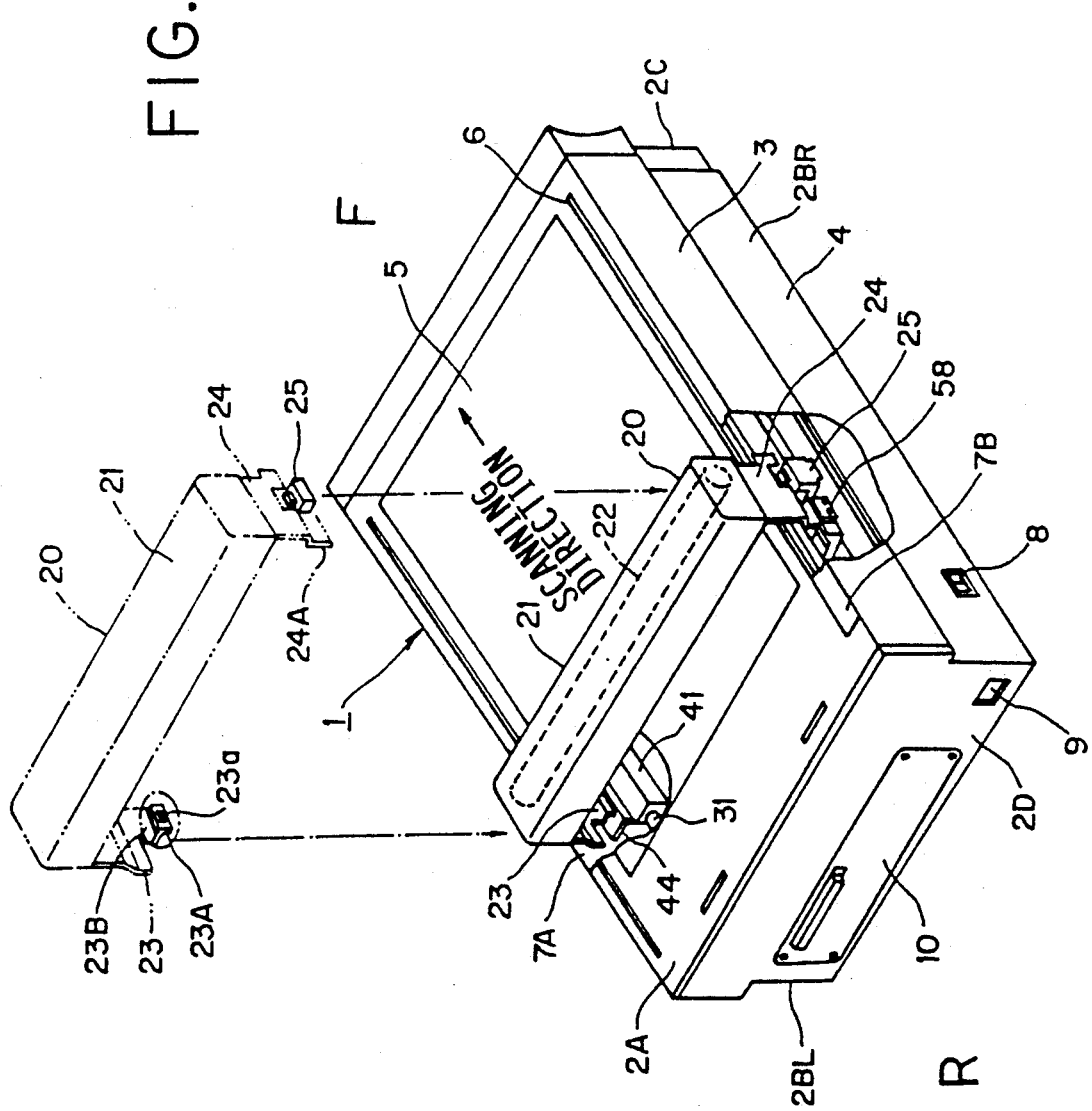
FIG. 1 is a perspective view of an image reader according to a preferred embodiment of the present invention.
Figure 2:
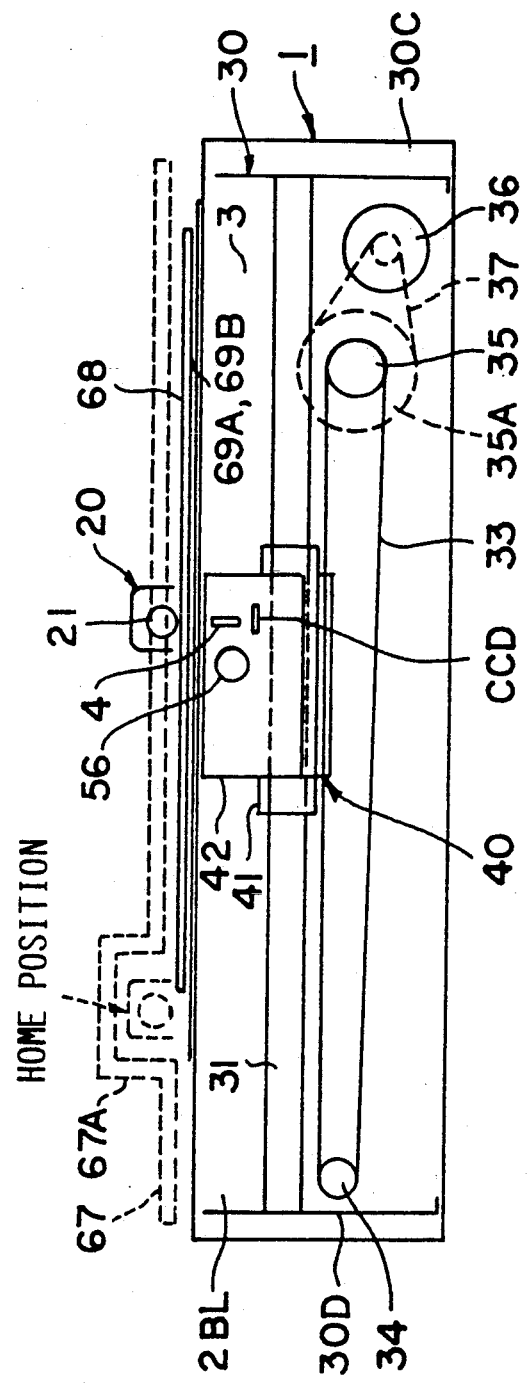
FIG. 2 is a schematic view showing an internal arrangement of a casing in FIG. 1.

In FIGS. 1 and 2, the image reader comprises a casing 1, which is composed of a first housing 3 for housing a read unit at the upper portion thereof under a ceiling 2A and a second housing 4 for housing a power source and a control unit, etc. at the lower portion thereof. Denoted at F and R are the front and rear sides of the casing 1 respectively. The ceiling 2A has a transparent manuscript glass plate 5 serving as a manuscript plate which is engaged therein and two slit shaped holder recesses 6 which slidably support the holder and are disposed in parallel with each other at both ends thereof and extend in the longitudinal directions thereof (in the scanning direction). A first holder entry 7A is defined at the rear end side of the holder recess 6 at the given position thereof (left side in FIG. 1) while a second holder entry 7B serving also as a power source connecting entry is defined at the rear end side of the holder recess 6 at the given position thereof (right side in FIG. 1) The casing 1 has a right side plate 2BR to which a power source switch 8 is attached and a rear plate 2D to which a power source connector 9 is attached and a front plate 2C to which a cover 10 provided with a gripper is detachably attached. Denoted at 2BL is a left side plate of the casing 1 while 2C is a front plate of the casing 1. The power source connector 9 is connected to a commercial power source, not shown.

Figure 3:
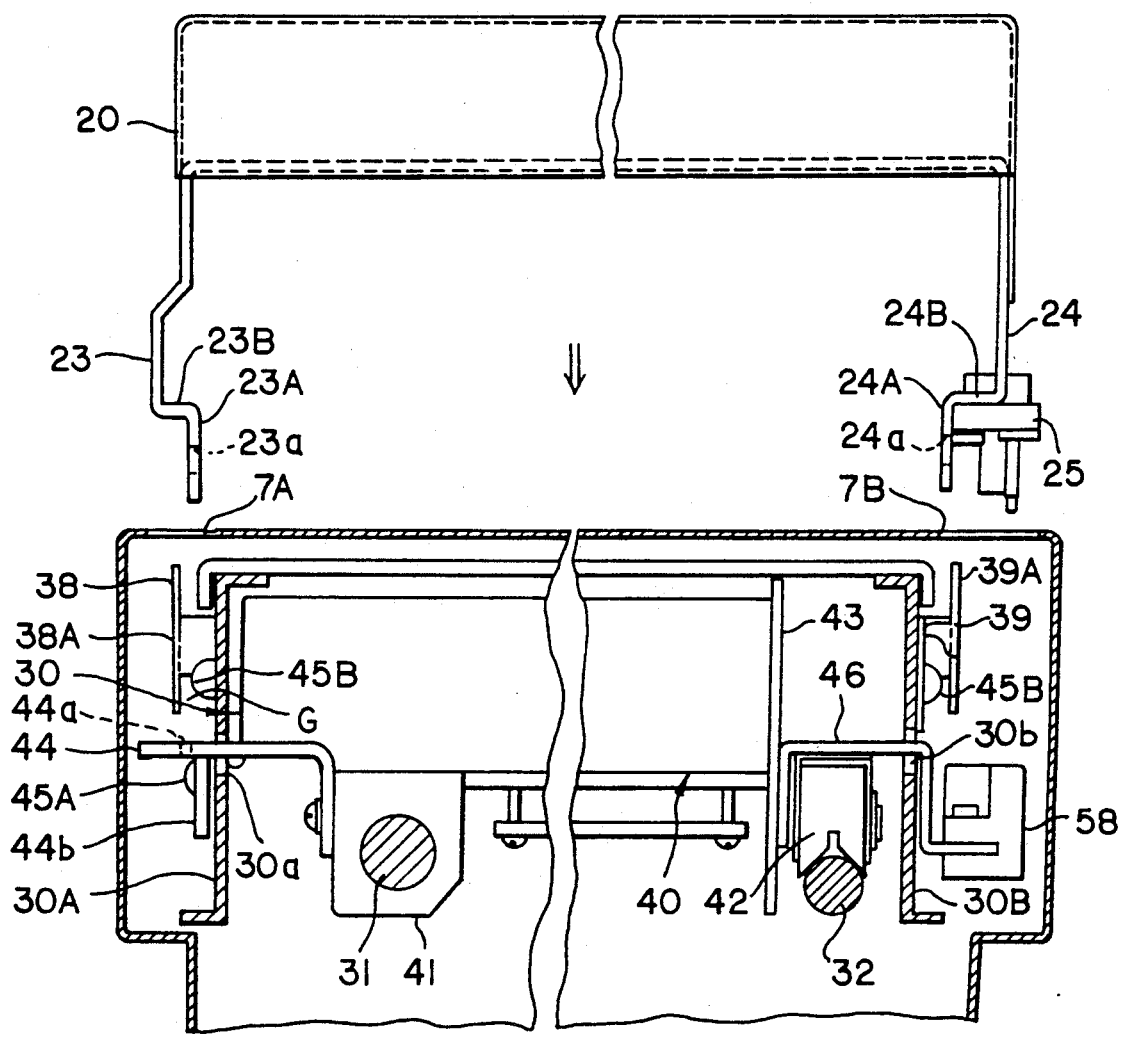
FIG. 3 is a schematic longitudinal cross-sectional view showing an internal arrangement of the casing in FIG. 1.
Figure 4:
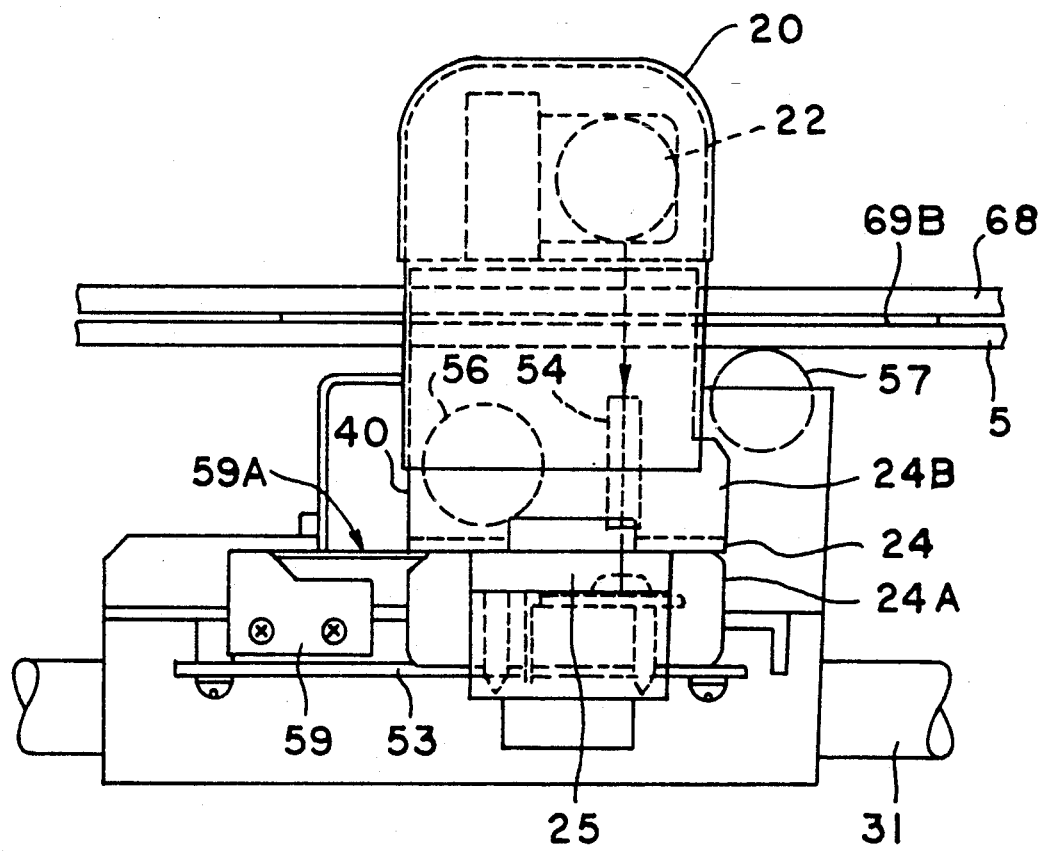
FIG. 4 is a side view showing a positional relation between a transmission read light source unit and a read unit in FIG. 1.
Figure 7:
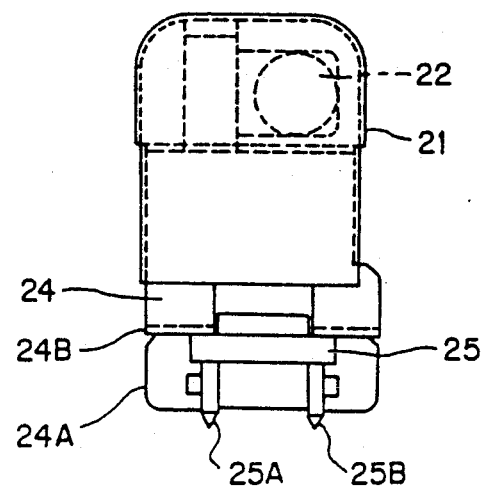
FIG. 7 is a side cross-sectional view showing a part of the transmission read light source unit in FIG. 3.

A transmission read light source unit 20 comprises a rectangular unit case 21 in which a fluorescent lamp 22 is housed as illustrated in FIGS. 4 and 7, a first plate-shaped holder 23 hung from the left end lower surface of the unit case 21 as illustrated in FIG. 3 and a second plate-shaped holder 23 hung from the right end lower surface of the unit case 21 as illustrated in FIG. 3. The first plate holder 23 has a stepped portion 23B and a latch portion 23A which is hung from a free end of the stepped portion 23B and is provided with a laterally directed engaging slit 23a. A second plate holder 24 has a stepped portion 24B and a latch portion 24A which is hung from a free end of the stepped portion 24B and is provided with a laterally directed engaging slit 24a. A power source plug 25 is attached to the second holder 24. The second holder 24 is retained by a lever 59A of an interlock switch (micro switch) 59, described later, at the lower surface of the upper stepped portion 24B thereof. The stepped portion 24B and the power source plug 25 constitute a power source connecting portion 26 and the power source connecting entry 7B has a slit through which the power source connecting portion 26 can pass slidably. The power source plug 25 has connecting pins 25A and 25B. The transmission manuscript 69B such as a positive film is placed on the transparent manuscript glass plate 5 and positioned under a diffusion plate 68 in FIG. 4.

FIG. 2 is a schematic view showing the internal structure of the first housing 3 for housing the read unit of the casing 1 the detail of which is illustrated in FIGS. 3 to 6. The first housing 3 comprises a casing 30 for partitioning the first housing 3, a slide shaft 31 which extends in the forward and backward directions of the casing 30 (in the directions to a front frame 30C and a rear frame 30D), a guide shaft 32 which extends in the forward and backward directions of the casing 30 (in the directions to a front frame 30D and a rear frame 30D), a slider 41 which is provided at the lower surface of a read unit 40 and engaged with the slide shaft 31 and a slider 42 provided on a carriage 43 of the read unit 40 which is engaged with the guide shaft 32. The first housing 3 further include an endless belt 33 which is entrained around a driven wheel 34 at the side of the rear frame 30D and a drive wheel 35 at the side of the front frame 30C and the lower portion of the carriage 43 of the read unit 40 is connected to the endless belt 33. The drive wheel 35 is normally and reversely rotated by a motor 36 by way of a pulley 35A and an endless belt 37.

In FIG. 3, the slider 41 supports a holder receiving member 44 which extends laterally by penetrating a slit 30a, which is defined at and extends forward and backward directions of the side frame 30A of the casing 30. The holder receiving member 44 has a slit 44a, which projects from the casing 30, and a support plate 44b which is hung from the slit 44a. A latching semicylindrical spring 45A is attached to the surface of the support plate 44b. A holder receiving member 46 is attached to the carriage 43 which extends laterally by penetrating a slit 30b, which is defined and extends forward and backward directions of the side frame 30B. The portion projecting from the first casing 30 is hung in the L-shape and has the surface to which the latching spring 45A is attached. The first and second plate holders 23, 24 and the holder receiving members 44 to 46 constitute a connecting mechanism.

Holder guides 38 and 39 are respectively attached to the side frames 30A and 30B of the casing 30 at the portion over the slits 30a and 30b to form respectively vertical guide spaces G immediately under the holder entries 7A and 7B. Latching semicylindrical springs 45B are provided at the surfaces of both holder guides 38 and 39. The holder guides 38 and 39 have guide plates 38A and 39A. The holder guides 38 and 39 and the springs 45B cooperate with the first and second holders 23 and 24 so as to constitute a holding mechanism.

Figure 8:
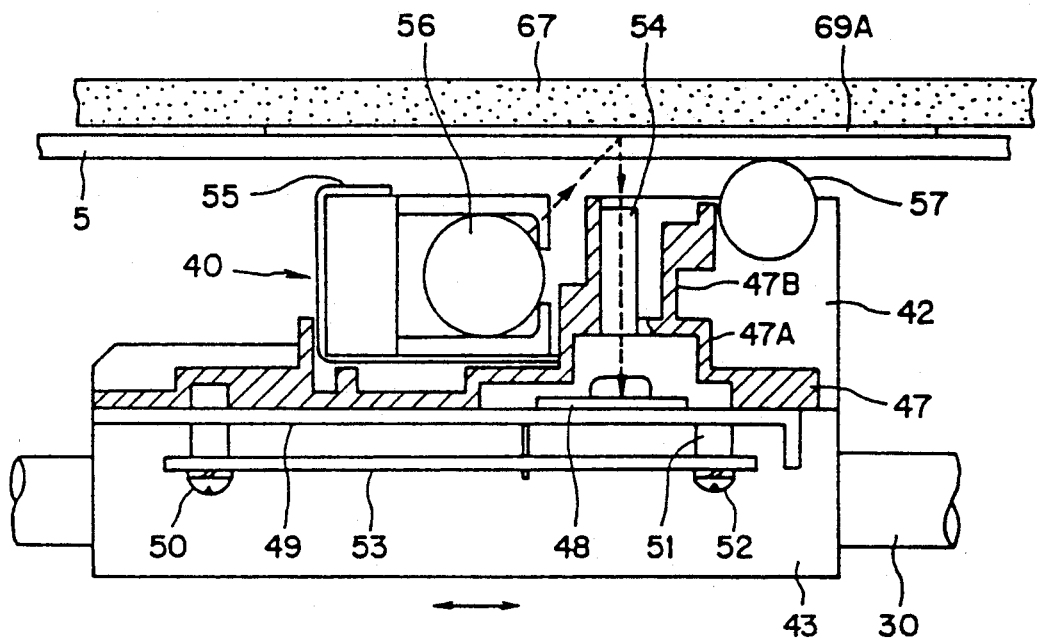
FIG. 8 is a side cross-sectional view showing the read unit in FIG. 2.
Figure 9:
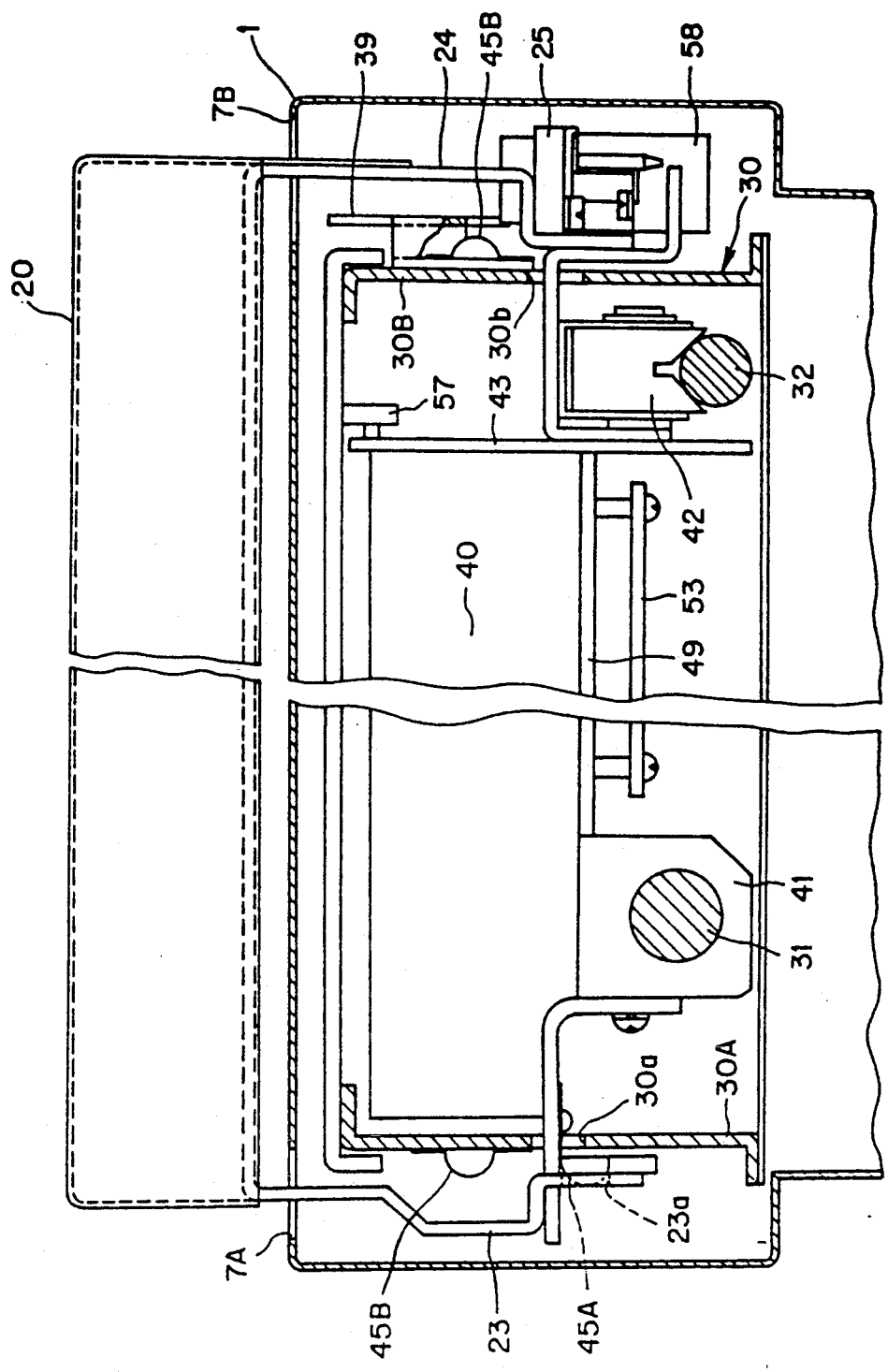
FIG. 9 is a longitudinal cross-sectional view showing the state where the transmission read light source unit is set to the read unit in FIG. 1.

The read unit 40 comprises, as illustrated in FIG. 8, a frame 47 and a plate-shaped sensor holder 49 which is attached to the frame 47 on the lower surface thereof by a screw 50 and has a charge coupled device (CCD) sensor 48 and a control board 53 which is supported by the screws 50 and 52 by way of a spacer 51 under the sensor holder 49. The frame 47 has a protuberance 47A for defining a space between the front side thereof and an upper surface of the sensor holder 49 and a cylinder portion 47B which rises from the protuberance 47A and has its lower end opening therein and a convergent rod lens array 54 which is attached to the cylinder portion 47B. The CCD sensor (line sensor) 48 is disposed immediately under the convergent rod lens array 54. A reflection read light source unit 55 has a fluorescent lamp 56 and is disposed at the rear portion of the cylinder portion 47B of the frame 47 and supported by the carriage 43. A guide roll 57 is disposed opposite to the slide shaft 31 of the carriage 43 and rolls while contacting the rear surface of the transparent manuscript glass plate 5. Designated at 67 is a manuscript presser cover and 69A is a reflection manuscript (printed matter). The manuscript presser cover 67 has a unit recess 67A for housing therein the transmission read light source 20 on the casing 1 at its home position as illustrated in FIG. 2.

Figure 5:
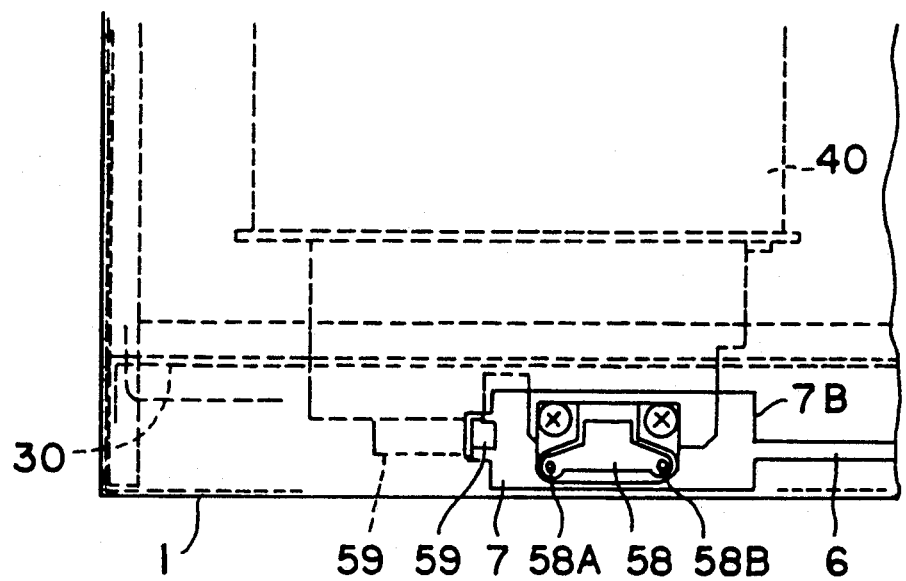
FIG. 5 is a plan view showing a part of the image reader in FIG. 3.
Figure 6:
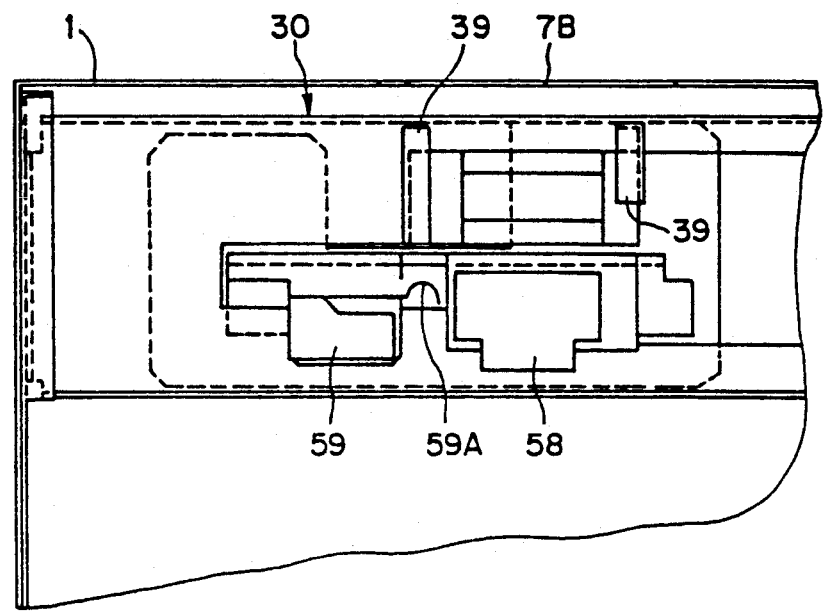
FIG. 6 is a side cross-sectional view showing a part of the image reader in FIG. 3.

In FIG. 5, a power source connector 58 is supported by the holder receiving member 46 and the connecting pins of the power source plug 25 are inserted into the power source connector 58. An interlock micro switch is attached to the holder receiving member 46 at the rear position which is remote at the given interval from the power source 58 connector 58. The power source connector 58 has receptors 58A and 58B. The micro switch 59 has a lever 59A. The power source connector 58 and the micro switch 59 constitute a power source connecting unit.

The power source connecting unit is confronted vertically with the power source connecting entry 7B when the read unit 40 is positioned at the home position HP (as illustrated in FIG. 2).

The transmission read light source unit 20 inserts the power source connecting portion 26 from the power source connecting entry 7B into the casing 1 and also inserts the first holder 23 into the holder recess 6 so that it is always held by the casing 1. At this state, the power source connecting portion 26 is placed on the power source connecting unit while it is not engaged with the power source connecting unit.

Figure 11:
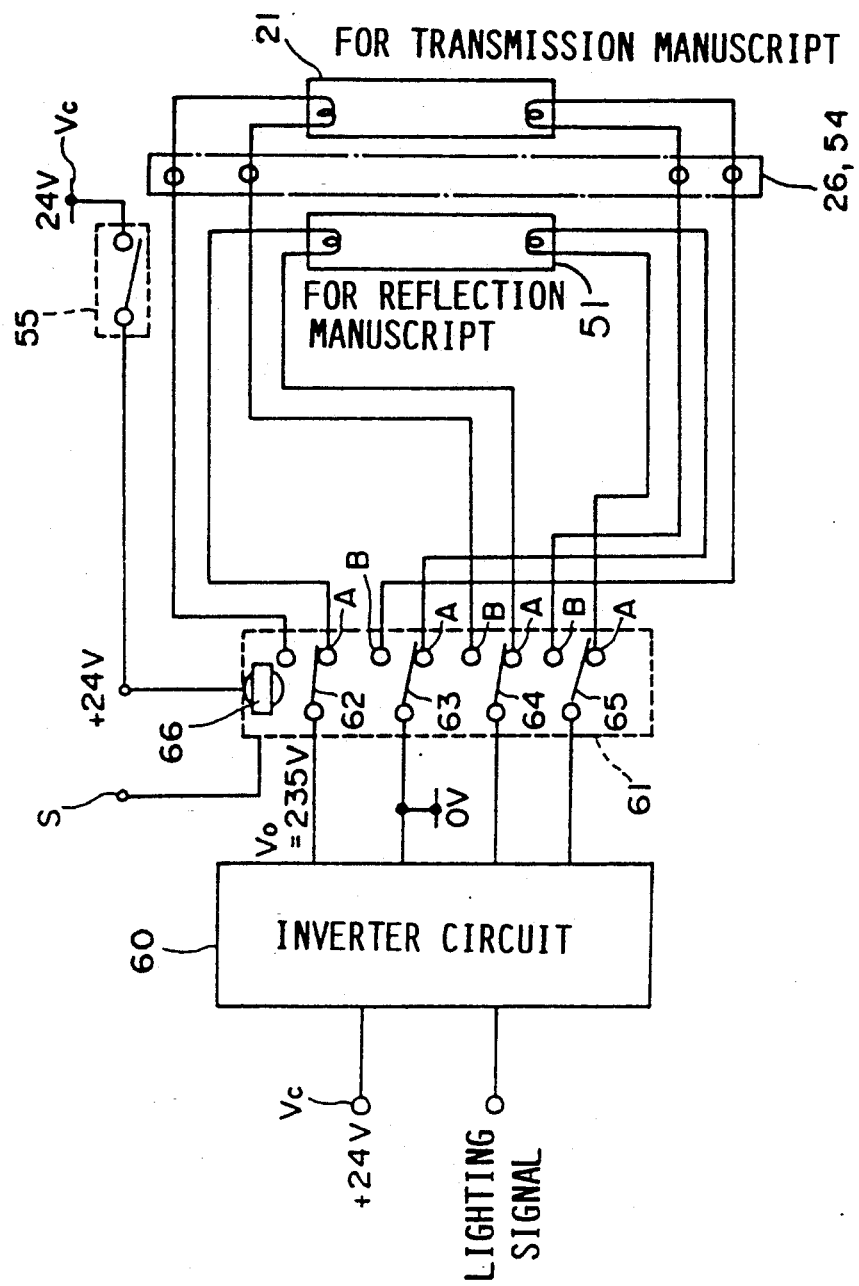
FIG. 11 is a circuit diagram of a luminaire power source unit in FIG. 1.
Figure 12:
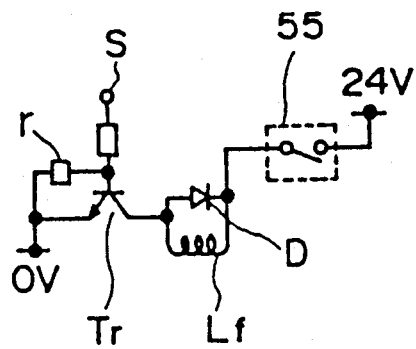
FIG. 12 is a circuit diagram of an interlock circuit of the luminaire power source unit in FIG. 11.

FIG. 11 is a circuit diagram of a luminaire power source unit which is housed in the second housing 4. The luminaire power source unit comprises an inverter source 60, a light source unit switching device 61 to which a reflection/transmission mode switching instruction S is applied, relay switches 62 to 65 which are normally switched to contact points A (at the side of reflection read light source unit 55) and an interlock circuit 66. The interlock circuit 66 has a circuit diagram as illustrated in FIG. 12 and comprises a transistor Tr, a coil Lf of a relay, a diode D and a resistor r wherein the relay switches 62 to 65 are switched to contact points B (at the side of the transmission read light source unit 20) when the coil Lf is biased. Designated at $V_o$ is an output voltage (235 V) of the inverter power source 60 and $V_c$ is a control voltage (24 V).

The operation of the image reader of the present invention will be described hereinafter.

Figure 10:
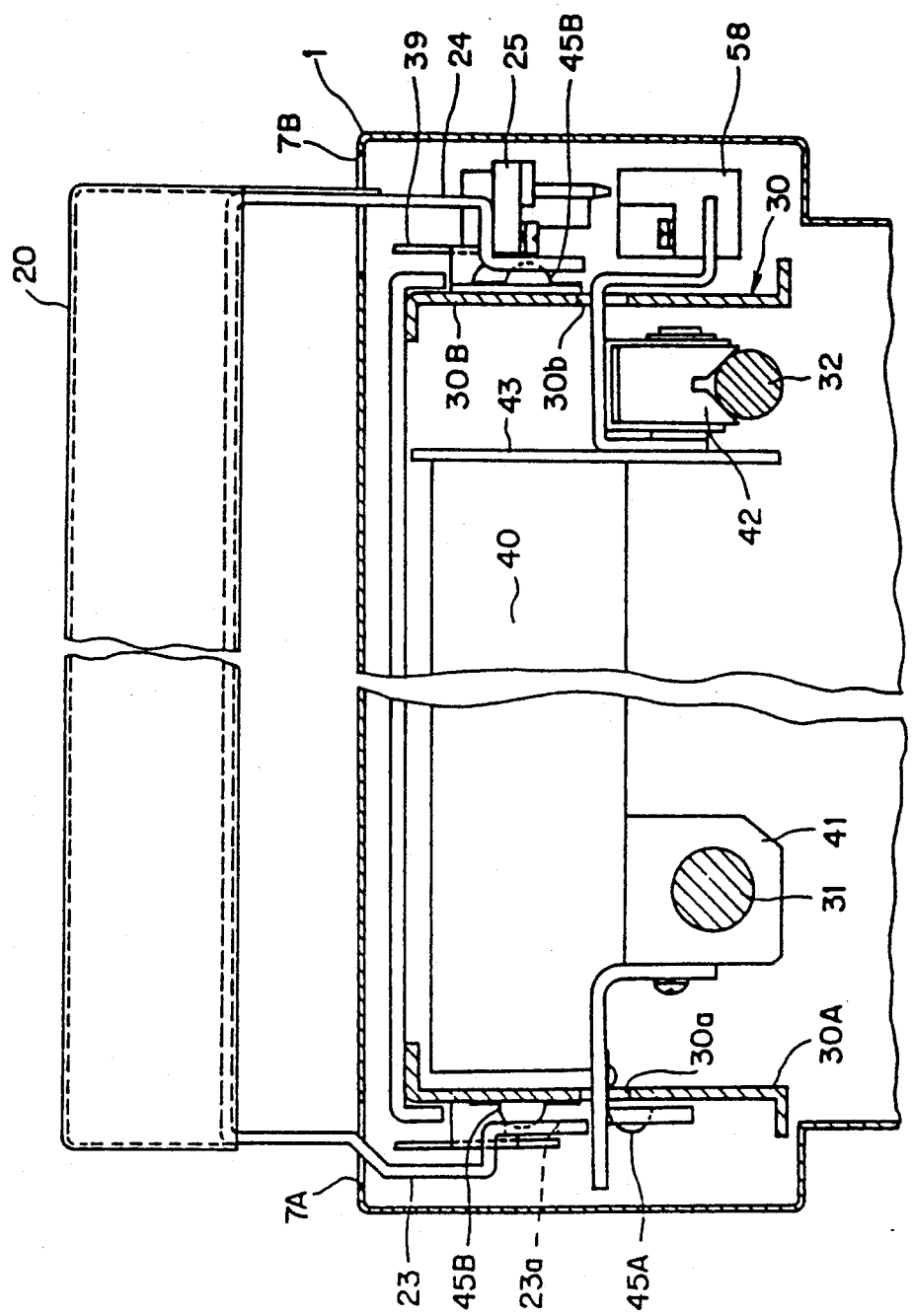
FIG. 10 is a longitudinal cross-sectional view showing the state where the transmission read light source unit is not set to the read unit in FIG. 1.

The transmission read light source unit 20 inserts the first and second holders 23 and 24 into the casing 1 through the holder entries 7A and 7B. The inserted first and second holders are respectively guided by the holder guides 38 and 39 since the holder guides 38 and 39 are provided in the casing 1. When the first and second holders 23 and 24 are guided to some position, the lower ends of the first and second holders contact the springs 45B to thereby compress the springs 45B so as to flatten the springs 45B and further lowers to a given position where the deformed spring 45B are restored to the original shape after engagement into the engaging slits 23a and 24a so that the first and second holders 23 and 24 are positioned and retained by the holding mechanism as illustrated in FIG. 10. At the time of reflection mode reading, the transmission read light source unit 20 is changed to a non-engagement state as illustrated in FIG. 10. At this state, the micro switch 59 is turned off since the stepped portion 24A of the holder 24 of the power source connecting portion 26 is spaced away from the lever 59A of the micro switch 59. Accordingly, even if the reflection/transmission mode switching instruction S is applied to the light source unit switching device 61, the coil Lf is not biased so that the relay switches 62 to 65 are positioned at the contact points A.

When the positioning of the first and second holders are completed, the reflection manuscript 69A is placed on the transparent manuscript glass plate 5 and is then covered by the manuscript presser cover 67 and a read start button, not shown, is pressed whereby the luminaire power is supplied to the reflection read light source unit 55 and the motor 36 is normally rotated. As a result, the belt 33 is driven in the direction of the arrow and the read unit 40 is moved from the home position HP to the direction of the arrow. At this time, the fluorescent lamp 56 of the reflection read light source unit 55 radiates the reflection manuscript 69A through the transparent manuscript glass plate 5 as illustrated in broken lines in FIG. 8 so that the reflective light is focused to bring about an image on the CCD sensor 48 by way of the convergent rod lens array 54.

At the time of transmission mode read, the transmission read light source unit 20 is lowered. When the transmission read light source unit 20 is lowered, the first and second holders 23 and 24 are compressed in the direction to flatten the springs 45B and slide on the springs 45B and are lowered so that the latch portion 23A of the first holder 23 passes through the slit 44a and thereafter contacts the spring 45A to thereby compress the spring 45A and lowers to the given position. As a result, the spring 45A is deformed and restored after engagement into the engaging slit 23a. At this time the stepped portion 23B is retained by the holder receiving member 44. The pins 25A and 25B of the power source plug 25 are engaged in the receptors 58A and 58B of the power source connector 58 so that both the pins 25A and 25B and the receptors 58A and 58B are electrically connected with one another whereby the stepped portion 24B of the second holder 24 is retained by the lever 59A of the micro switch 59 to thereby push it down. As a result, the micro switch 59 is turned on.

In conclusion, when the reflection/transmission mode switching instruction S is applied to the light source unit switching device 61, the coil Lf is biased so that the relay switches 62 to 65 are switched to the contact points B.

The transmission manuscript 69B is thereafter placed on the transparent manuscript glass plate 5 and the diffusion plate 68 instead of the manuscript presser cover 67 covers the transmission manuscript 69B. The read start button, not shown, is pressed so that the luminaire power is supplied to the transmission read light source unit 20 to thereby normally rotate the motor 36 whereby the belt 33 is driven in the direction of the arrow and the read unit 40 is moved from the home position HP to the direction of the arrow. The transmission read light source unit 20 is connected to the read unit 40 by way of the spring 45A at the side of the first holder 23 while the power source plug 25 is engaged with the power source connector 58 at the second holder 24 so that the transmission read power source unit 20 is moved together with the read unit 40. At this time, the first and second holders 23 and 24 move inside the holder recesses 6.

The light from the fluorescent lamp 21 of the transmission read light source unit 20 passes through the transmission manuscript 69B and the transparent manuscript glass plate 5, as illustrated in broken lines of FIG. 4, and the transmitted light passes through the convergent rod lens array 54 and brings about the image on the CCD sensor 48.

The transmission manuscript 69B can be read also with high quality since the optical path length of the transmission light is substantially the same as that of the reflection light.

Since the luminaire inverter power source 60 is commonly used by the reflection read light source unit 55 and the transmission read light source unit 20, the cost of the luminaire power source unit is cheap.

Since there is provided the switch 59 which is turned on provided that the read light source connecting portion 26 of the transmission read light source unit 20 is engaged with and connected with the power source connecting unit of the read unit 40 and the power is supplied to the transmission power source unit 20 when the switch 59 is turned on and the reflection/transmission mode switching instruction S is applied to the light source switching device 61, the power is not supplied to the transmission read light source unit 20 unless the power source connecting portion 26 is not engaged with and connected to the power source connecting unit of the read unit 40. Furthermore, since the power connecting portion 26 is engaged with and connected to the power source connecting unit of the read unit 40 and the ON/OFF switching of the switch 50 are respectively effected in the casing 1 and the reflection read light source unit 55 is also provided in the casing 1, there is no likelihood that the operator, who operates the transmission read light source unit 20, receives an electric shock by the high power voltage to be supplied to the fluorescent lamp.

Figure 13:
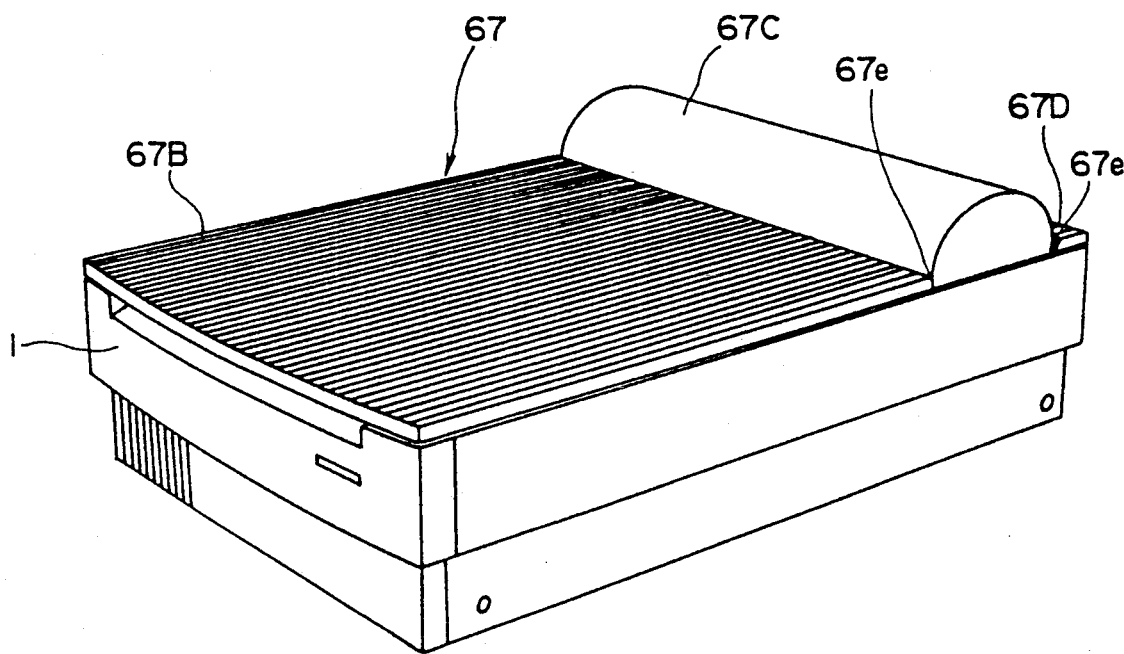
FIG. 13 is a perspective view showing an example of a manuscript presser cover in FIG. 2 wherein the manuscript presser cover is closed.
Figure 14:
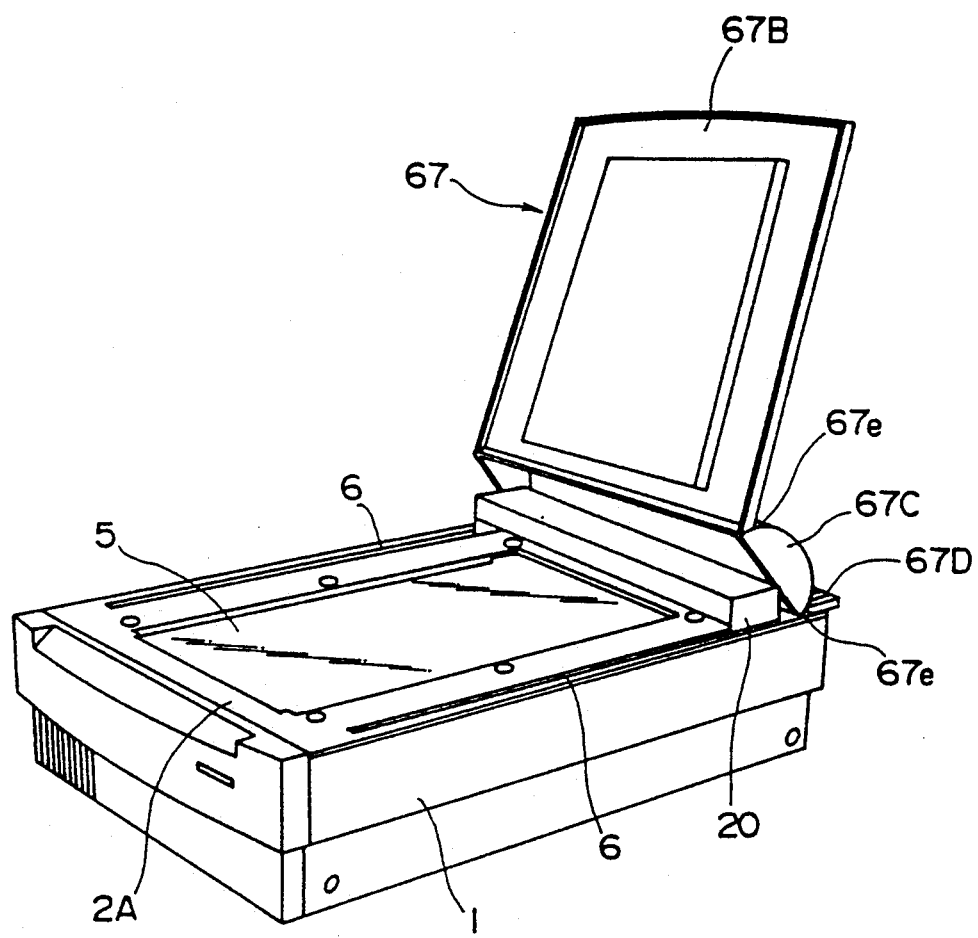
FIG. 14 is a perspective view showing an example of the manuscript presser cover in FIG. 2 wherein the manuscript presser cover is open.

According to the present embodiment, the manuscript presser cover 67 is illustrated by the dotted lines as illustrated in FIG. 2 but not illustrated in detail. A preferred detail of the manuscript presser cover 67 is illustrated in FIGS. 13 and 14. The manuscript presser cover 67 as illustrated in FIGS. 13 and 14 is integrated with a cover body 67B, a transmission read light source unit storage portion 67C and a skirt portion 67D which are arranged in order and also has a size covering the entire surface of the casing 1. The transmission read light source unit storage portion 67C of the manuscript presser cover 67 is semicylindrical and closed at both ends thereof and partitions the transmission read light source unit storage space 67c (FIG. 13) inside thereof and has a hinge portion 67e (FIG. 13) at the boundaries between it and the cover body 67B and between it and the skirt portion 67D. The transmission read light source unit storage portion 67C can be bent upward to some angle relative to the skirt portion 67D and the cover body 67B can be bent upward to some angle relative to the transmission read light source unit storage portion 67C.

Since the manuscript presser cover 67 can store the transmission read light source unit 20, which is permitted to be in a non-engaged state at the home position, into the transmission read light source unit storage portion 67C and can place it on the transparent manuscript glass plate 5, it is possible to replace the manuscript by another manuscript by raising and lowering the cover body 67B alone at the time of the reflection mode read.

Since the transmission read light source unit storage portion 67C of the manuscript presser cover 67 is semicylindrical and closed at both ends thereof, thereby giving beauty to the image reader.

Figure 15A:
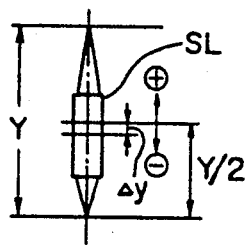
FIGS. 15A and 15B are views explaining a focal depth of a convergent rod lens in FIG. 4.
Figure 15B:
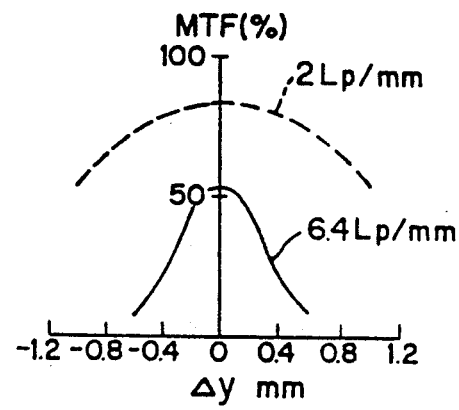
Figure 16:
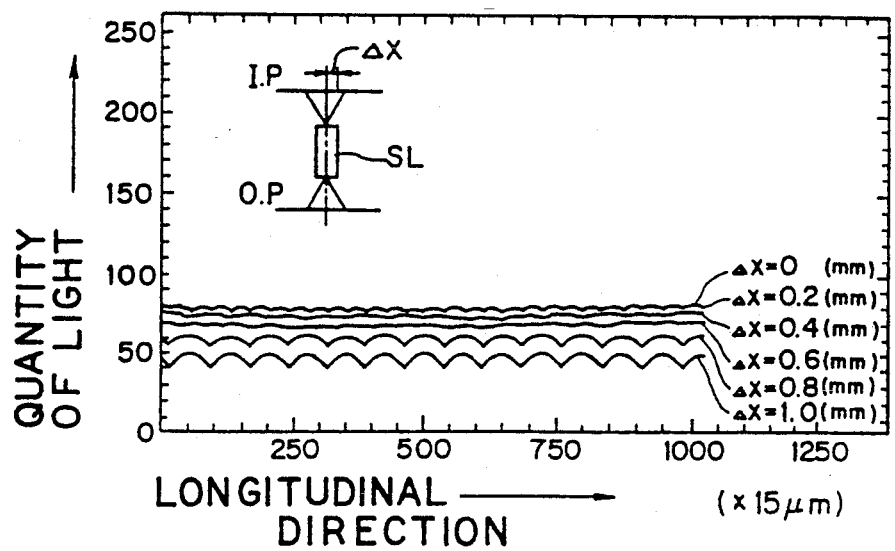
FIG. 16 is a view explaining the influence caused by the displacement of center lines of the convergent rod lens and a line sensor in FIG. 4.

When the convergent rod lens SL is displaced by $\Delta y$ as illustrated in FIG. 15(A) relative to the regular position, the image transmission characteristic MTF is sharply lowered as illustrated in FIG. 15(B) so that the image is likely to blur. When the optical axis of the self-focus lens SL and the center line of the CCD sensor 48 are displaced by $\Delta X$, the intensity of light becomes uneven as illustrated in FIG. 16 to thereby deteriorate the image quality. Accordingly, in order to obtain high quality image, it is necessary to align the optical position of the convergent rod lens array 54 with the position of the CCD sensor 48. However, since the CCD sensor 48 has a line length greater than the width of the manuscript (A4, A3 sizes) and the convergent rod lens array 54 has the same length, it takes much time and labor for aligning the optical position of the convergent rod lens array 54 with the position of the CCD sensor 48, which causes the productivity to lower and the image reader to cost high.

Figure 17:
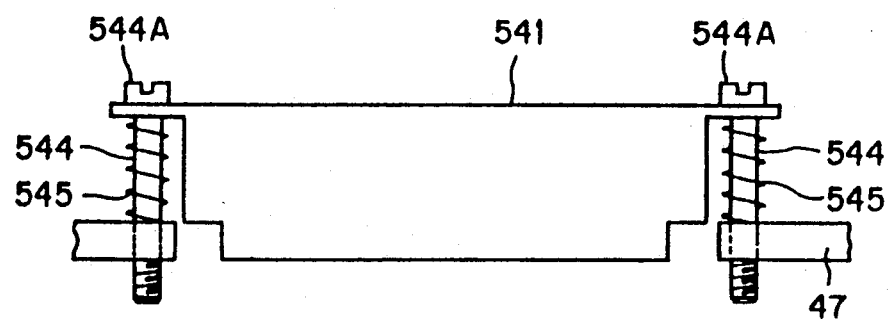
FIG. 17 is a view showing an optical axis position minute regulating mechanism of the convergent rod lens array in FIG. 4.
Figure 19:
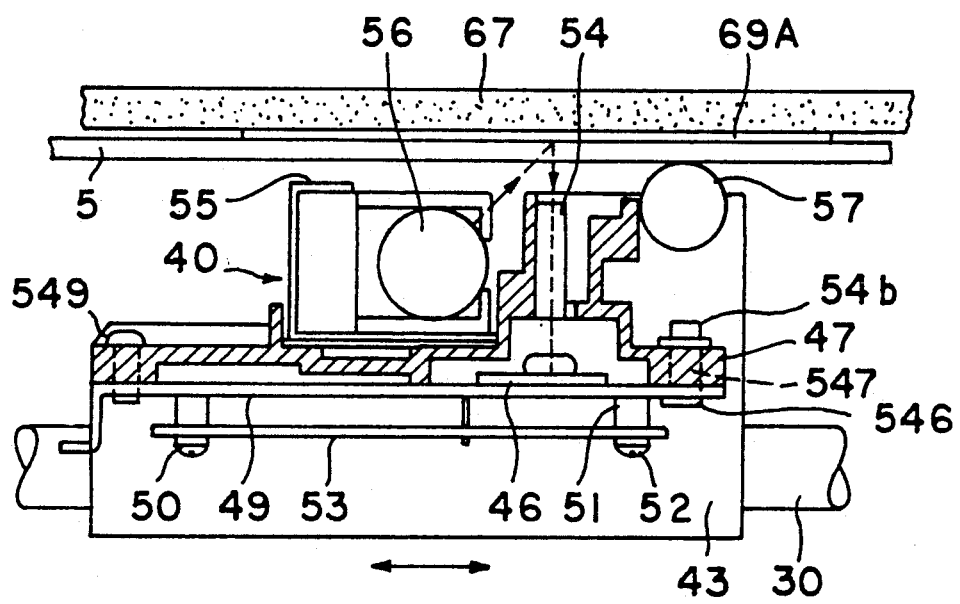
FIG. 19 is a view showing a line direction position minute regulating mechanism of a CCD sensor in FIG. 8.

The inventors of the present application have solved this problem by supporting the convergent rod lens array 54 by way of an optical shaft position minute regulating mechanism as illustrated in FIG. 17 and by regulating the CCD sensor 48 in the line direction position by a line direction position minute regulating mechanism as illustrated in FIG. 19.

Figure 18:
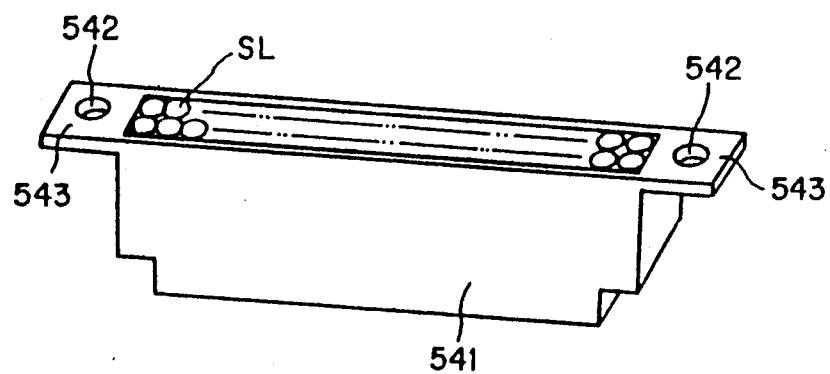
FIG. 18 is a view showing the holder of the convergent rod lens array in FIG. 4.

In FIG. 17, a holder 541 of the convergent rod lens array 54 has ear portions 543 which extend at the longitudinal direction thereof and have holes 542 therein as illustrated in FIG. 18. Regulating screws 544 slidably penetrate the holes 542 of the ear portions 543 and screws into the frames 47 and rise perpendicular relative to the frames 47. Coil springs 545 are wound around the regulating screws 544 to thereby bias the ear portions 543 toward the lower surfaces of the heads 544A of the regulating screws 544.

With this arrangement, when the regulating screw 544 are turned to screw into the frame 47, the ear portions 543 are lowered against the resiliency of the coil springs 545 to the extent corresponding to the turning amount of the regulating screws 544 (−y direction in FIG. 15). When the regulating screw 544 are reversely turned, the ear portions 543 are pushed up by the resiliency of the coil springs 545 (y direction in FIG. 15) so that the position of the convergent rod lens array 54 can be minutely regulated in the direction of the optical axis with ease whereby the image is not blurred.

Figure 20A:
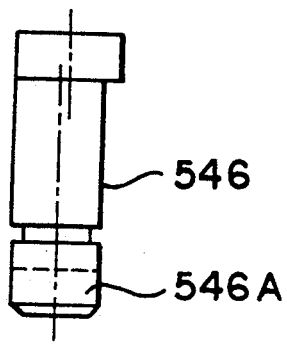
FIGS. 20A and 20B are views of an eccentric shaft in FIG. 19.
Figure 20B:
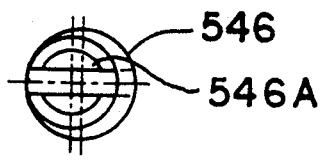
Figure 21:
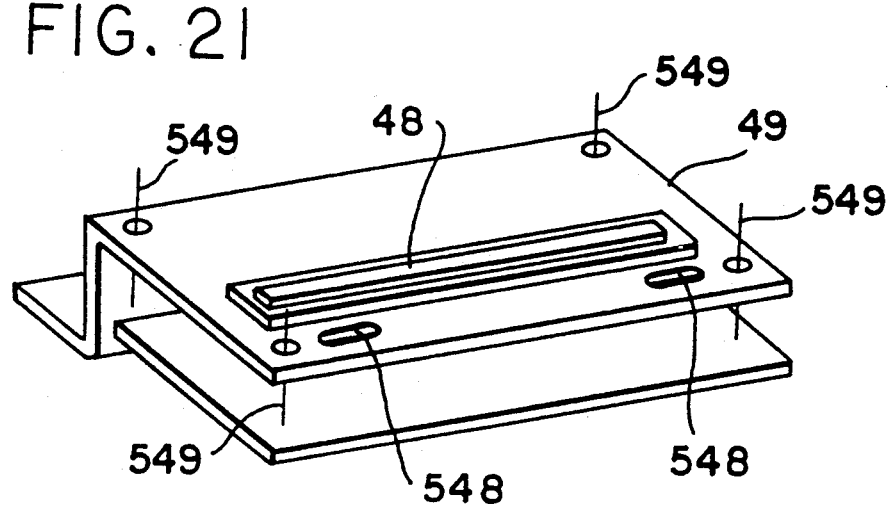
FIG. 21 is a perspective view of a sensor holder in FIG. 19.
Figure 22:
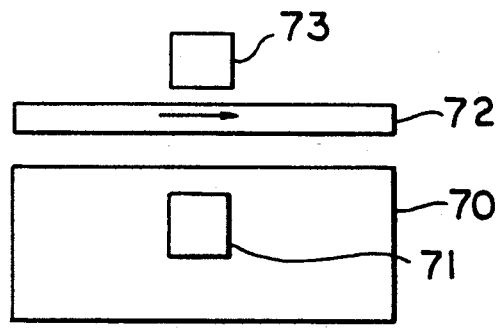
FIG. 22 is a schematic view explaining a basic operation of a conventional image reader.

In FIG. 19, an eccentric shaft 546 has a shape as illustrate in FIGS. 20(A) and 20(B) and slidably penetrates a hole 547 defined in the frame 47 and extends toward the sensor holder 49. FIG. 20(A) is a side view of the eccentric shaft 546 and FIG. 20(B) is a bottom view of the eccentric shaft 546. The sensor holder 49 has two eccentric shaft engaging holes 548 in which the lower end portions 546A of the eccentric shaft 546 are engaged as illustrated in FIG. 21. The eccentric shaft engaging holes 548 extends in the line direction of the CCD sensor 48. The sensor holder 49 is fixed to the lower surface of the frame 47 by the bolts 549 at the four corners thereof.

In this arrangement, when the four bolts 549 are loosened and the two eccentric shaft 546 are turned, e.g. rightward, the sensor holder 49 is displaced rightward in FIG. 19 (−x direction in FIG. 16) by the interval corresponding to the turning amount of the eccentric shafts 546 while when the two eccentric shafts 546 are turned, e.g. leftward, the sensor holder 49 is displaced leftward in FIG. 19 (x direction in FIG. 16) for the interval corresponding to the turning amount of the eccentric shafts 546. As a result, if the CCD sensor 48 is minutely regulated in the x direction thereof so that the divergence in the x direction of the convergent rod lens array 54 can be eliminated with ease and it is possible to obtain the even image with ease. Since it is possible to correct the divergence from the focal depth and the center line of the convergent rod lens array 54 independently if the line direction position minute regulating mechanism and the optical axis position minute regulating mechanism are provided in the image reader, it is possible to accurately align the optical positioning between the convergent rod lens array 54 and the CCD censor 48 for a short time so that the productivity of the image reader can be improved compared with the conventional image reader.

According to the present invention, the transmission optical source unit and the read unit can be connected to each other by interposing the manuscript plate therebetween so as to move together so that the optical path of the transmitted light can be shortened at the time of reading the transmission manuscript. As a result, the reading quality can be improved. Furthermore, reflection manuscript can be read while the transmission read light source unit is set over the casing. Still furthermore, the luminaire power source is commonly used in the transmission read light source unit and the reflection read light source unit so that the cost for the luminaire power source can be reduced.

What is claimed is:

1. In an image reader which includes:
   a casing having a ceiling of a transparent manuscript plate, the casing further housing therein a read unit provided with a reflection read light source unit, a drive mechanism for reciprocally moving the read unit from its home position, and a luminaire power source unit; and a transmission read light source unit provided separately from the casing; wherein the transmitted light which has passed through the manuscript or the reflected light which has reflected from the manuscript is focused on a receiving surface of a read sensor of the read unit to thereby produce an image thereon;
   the improvement comprising wherein the image reader further includes a holding mechanism for supporting the transmission read light source unit and a connecting mechanism for connecting the transmission read light source unit to the read unit mechanically and electrically, the connecting mechanism being slidable in holder recesses provided in the ceiling, the luminaire power source unit being provided with an inverter power source which is common to the reflection read light source unit and the transmission read light source unit and being provided with a light source unit switching device which can switch the output of the inverter power source to the reflection read light source unit or the transmission read light source unit.

2. An image reader according to claim 1, wherein the image reader further includes the transmission read light source unit having first and second holders provided at respective side ends thereof, one of said holders supporting a power source connecting portion, the ceiling having first and second holder entries through which the first and second holders can pass and having slit-shaped recesses which extend in the moving direction of the read unit, the read unit supporting a power source connecting unit which can be engaged with and connected to the power source connecting portion, which is disposed immediately under one of the holder entries.

3. An image reader according to claim 2, wherein a connecting mechanism includes holder guides provided perpendicularly inside the casing, holder receiving portions provided on the read unit and positioned under the holder guides, and the first and second holders, and wherein each holder receiving portion has an elastically deformable latching spring at the perpendicular surface thereof and the first and second holders have latching slits which are disposed at the lower hanging ends thereof and in which the latching springs can be engaged by a one-shot operation.

4. An image reader according to claim 2, wherein the power source connecting unit of the read unit has an interlock switch which controls the light source unit switching device, and the power source connecting portion of the transmission read light source unit has a retaining member which can engage a switching member of the interlock switch, the interlock switch being OFF when the power source connecting unit is not connected to the power source connecting portion so that the light source unit switching device is maintained in a state selecting the reflection read light source unit.

5. An image reader according to claim 4, wherein the retaining member which can engage the switching member is a flat stepped portion of one of the first and second holders.

6. An image reader according to claim 4, wherein the interlock switch is disposed at an anode side of the light source switching device of the luminaire power source unit.

7. An image reader according to claim 1, wherein the holding mechanism includes holder guides within the casing, elastically deformable latching springs provided at the vertical surfaces of the holder guides, and latching slits which are provided at the lower end hanging portions of the first and second holders and in which the latching springs can be engaged by a one-shot operation, wherein the transmission read light source unit can be held by the read unit without being connected to the read unit mechanically and electrically.

8. An image reader according to claim 1, wherein a manuscript presser cover to be laced on the transparent manuscript plate has a cover body and a transmission light source unit storage portion which continues to the cover body.

9. An image reader according to claim 8, wherein the transmission light source unit storage portion is cylindrical, is closed at both ends thereof, and continues to the cover body by way of hinged portions so as to be bent relative to each other.

10. An image reader according to claim 1, wherein the read unit has a read sensor which is a line sensor and receives a transmitted light which has passed through the manuscript or reflected light which is reflected from the manuscript in the line direction through a convergent rod lens array.

11. An image reader according to claim 10, wherein the convergent rod lens array of the read unit is supported on a frame of the read unit by an optical axis direction position minute regulating mechanism.

12. An image reader according to claim 11, wherein the optical axis direction position minute regulating mechanism includes a holder, regulating screws which slidably penetrate ear portions of the holder extending in the longitudinal directions of the holder and screw into the frame and rise perpendicularly relative to the frame, and coil springs which are wound around the regulating screws to urge and press the ear portions toward the heads of the regulating screws.

13. An image reader according to claim 1, wherein the read unit has a line direction position minute regulating mechanism for the read sensor.

14. An image reader according to claim 13, wherein the line direction position minute regulating mechanism includes a sensor holder for the read sensor which is releasably screwed to the frame, an eccentric shaft rotatably supported on one of the frame and sensor holder, and a slit which is provided in the other of the frame and sensor holder, which extends in the line direction, and which receives an eccentric portion of the eccentric shaft.

* * * * *